United States Patent [19]

Brandstetter et al.

[11] Patent Number: 5,391,655

[45] Date of Patent: Feb. 21, 1995

[54] PREPARATION OF AN AROMATIC VINYL COMPOUND

[75] Inventors: Franz Brandstetter, Neustadt; Hermann Gausepohl, Mutterstadt; Reiner Thiele, Kaiserslautern, all of Germany

[73] Assignee: BASF Aktiengesellschaft, Ludwigshafen, Germany

[21] Appl. No.: 136,931

[22] Filed: Oct. 19, 1993

[30] Foreign Application Priority Data

Oct. 24, 1992 [DE] Germany .................. 4235980

[51] Int. Cl.⁶ .................. C08F 4/48; C08F 12/08
[52] U.S. Cl. .................. 526/64; 526/65; 526/173; 526/346; 526/347; 526/347.2
[58] Field of Search .......... 526/64, 65, 173, 346, 526/347, 347.2

[56] References Cited

U.S. PATENT DOCUMENTS

| | | | |
|---|---|---|---|
| 3,030,346 | 4/1962 | Cooper et al. | 260/83.7 |
| 3,035,033 | 5/1962 | Kenmore et al. | 260/88.1 |
| 3,806,556 | 4/1974 | Paleologo et al. | 526/65 |
| 3,812,088 | 5/1974 | Bennett | 526/64 |
| 3,954,894 | 5/1976 | Kamienski et al. | 260/665 |
| 4,016,348 | 4/1977 | Adams | 526/293 |
| 4,200,713 | 4/1980 | Wingler et al. | 526/64 |
| 4,205,016 | 5/1980 | Tung et al. | 260/665 |
| 4,883,846 | 11/1989 | Moore et al. | 526/73 |

FOREIGN PATENT DOCUMENTS

| | | |
|---|---|---|
| 176611 | 4/1986 | European Pat. Off. |
| 307238 | 3/1989 | European Pat. Off. |
| 373883 | 6/1990 | European Pat. Off. |
| 471550 | 2/1992 | European Pat. Off. |

Primary Examiner—Joseph L. Schofer
Assistant Examiner—Tom Weber
Attorney, Agent, or Firm—Keil & Weinkauf

[57] ABSTRACT

A process is described for preparing styrene polymers by continuous anionic polymerization, the monomer or monomers and the organometallic compound serving as starter (initiator) being added in solution to a tubular reactor operating essentially without backmixing and being left in the reactor until the monomer has been consumed, wherein the polymerization is carried out in at least two successive tubular reactor sections operating in each case essentially adiabatically, with in each case at least one heat exchanger arranged between the sections. If desired a proportion of the starter and/or of the monomer is added to at least one reactor connected downstream of the first reactor.

3 Claims, 1 Drawing Sheet

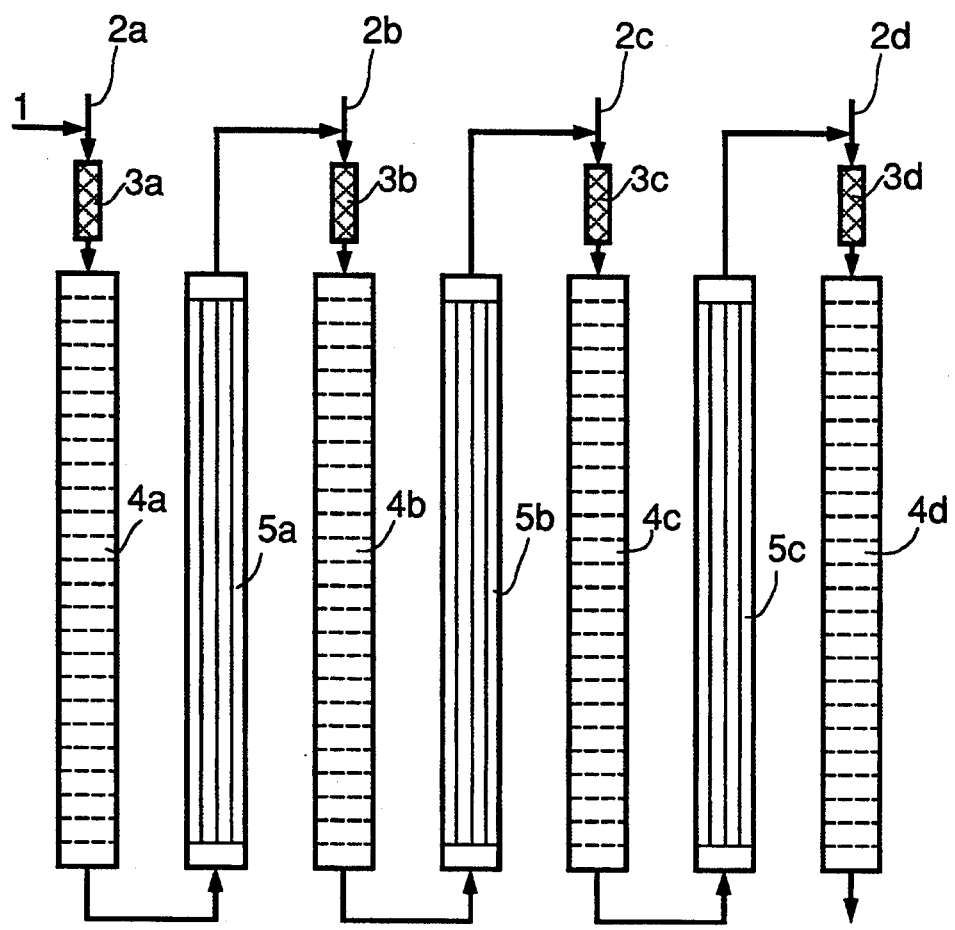

PREPARATION OF AN AROMATIC VINYL COMPOUND

BACKGROUND OF THE INVENTION

1. Field of the Invention

The present invention relates to a process for preparing an aromatic vinyl compound, in particular crystal-clear polystyrene, by anionic polymerization, the monomer or monomers and the organometallic compound serving as starter (initiator) being added in solution to a tubular reactor operating essentially without backmixing.

2. Description of the Relevant Prior Art

The following documents are cited:

| | |
|---|---|
| EP 176 611 | U.S. Pat. No. 3,030,346 |
| EP 471 550 | U.S. Pat. No. 3,954,894 |
| U.S. Pat. No. 482,391 | U.S. Pat. No. 4,196,153 |
| U.S. Pat. No. 3,035,033 | U.S. Pat. No. 4,200,713 |
| U.S. Pat. No. 4,883,846 | U.S. Pat. No. 4,205,016 |

Loop reactors, i.e. tubular reactors that loop back into themselves, are described in EP-A 176 611 and U.S. Pat. No. 3,035,033 for the preparation of anionic polystyrene. It is recommended that the residence time be at least 1 to 3 hours and that the circulating volume be at least 15 times and preferably at least 25 times as large as the feed volume. Accordingly, only a small space-time yield is achieved by such a process, i.e. a very large, complex apparatus is required for production on an industrial scale.

U.S. Pat. No. 4,883,846 describes a process for the anionic polymerization of styrene, in which styrene in ethylbenzene is adiabatically polymerized in a reactor using n-butyllithium.

The disadvantage of this process is that only relatively small styrene concentrations can be used, so as not to let the final temperature rise too high since too high a final temperature would lead to a thermal termination and thus to an incomplete reaction and uncontrolled molecular weight distribution. Consequently, also only a small space-time yield is achieved.

SUMMARY OF THE INVENTION

It is an object of the present invention to provide an economical process having the aforementioned features that can be implemented in as small a plant as possible.

We have found that this object is achieved when the polymerization is carried out in a tubular reactor having at least two successive sections each operated essentially adiabatically and separated by a heat exchanger arranged between the sections.

In a further embodiment of the invention at least a proportion of the starter and, in yet a further embodiment, at least a proportion of the monomer or monomers are added to one or more of the reactor sections connected downstream of the first reactor section.

Suitable monomers are anionically polymerizable aromatic vinyl compounds, for example styrene, α-methyl styrene, vinyl toluene or tert-butyl styrene or their mixtures; for the preparation of (block) copolymers, suitable dienes such as butadiene or isoprene may also be polymerized.

Solvents that may be used include hydrocarbons. Suitable solvents are aliphatic, cycloaliphatic or aromatic hydrocarbons that are liquid under the reaction conditions and that preferably have 4 to 12 carbon atoms. Examples of such hydrocarbons are pentane, cyclohexane, methylcyclohexane, toluene, ethylbenzene or xylene.

Suitable initiators for the polymerization are the known monolithium hydrocarbons of the formula RLi, where R is an aliphatic, cycloaliphatic, aromatic or, in particular, an aliphatic-aromatic hydrocarbon radical. The hydrocarbon radical may have from 1 to about 12 carbon atoms.

The following may be mentioned as examples of the lithium hydrocarbons according to the invention: methyllithium, ethyllithium, n- or sec-butyllithium, isopropyllithium, cyclohexyllithium or phenyllithium. Particularly preferred are n-butyllithium or sec-butyllithium.

The polymerization takes place under the customary conditions for anionic polymerization, i.e. with the exclusion of air and moisture and at up to 160° C., preferably at from 40° to 120° C. The molecular weight is adjusted, as is generally known, by the molar ratio of initiator to aromatic vinyl compound.

The polymerization according to the invention makes it possible on the one hand to obtain products having a narrow molecular weight distribution, i.e. the quotient of the weight average molecular weight and number average molecular weight is from about 1 to 1.5.

Products having a broader or even multimodal distribution are obtained by intermediate feed of the initiator, i.e., as previously explained, a proportion or proportions of the initiator is/are first of all held back and added to a downstream reactor section.

The polymerization is carried out as far as possible to a conversion of more than 99.9%.

A reaction stretch for the implementation of the process according to the invention is illustrated diagrammatically in FIG. 1. Such a stretch essentially comprises N tubular reactors and N−1 heat exchangers, arranged in such a way that a heat exchanger is connected downstream of each reactor, with the exception of the last reactor. The reactors may for example contain static mixers in order to promote a thorough radial mixing. Suitable mixers are Kenics mixers or SMX mixers, such as are marketed by Sulzer (cf. Chem.-Ing.-Techn. 52 (1980), p. 285–291). The reaction proceeds essentially adiabatically in the individual reactors. The initiator solution and all the solvent are added to the first reactor; the aromatic vinyl compound to be polymerized may be sub-divided among the individual reactors so that the maximum temperature occurring in each case is not more than 80° C., preferably not more than 50° C., above the temperature at the respective reactor inlet.

In this way a very high space-time yield and products having a narrow molecular weight distribution are obtained. The molecular weight distribution of the polymers formed can furthermore be controlled by splitting the amount of initiator used and by the point of addition of the individual fractions. In this way products having a broad distribution as well as those having a bimodal or multimodal distribution can be obtained.

BRIEF DESCRIPTION OF THE DRAWING

The FIGURE is a diagrammatic view of a portion of the apparatus used in the process of the invention. The FIGURE shows in series, inlets for monomers and solvents, premix units, tubular reactors, and heat exchangers.

DESCRIPTION OF THE PREFERRED EMBODIMENTS

An arrangement as illustrated in FIG. 1 was used, four tubular reactors (4a, 4b, 4c, 4d) each of length 10 m being provided, the reactors 4a and 4b each having a diameter of 50 mm and the reactors 4c and 4d each having a diameter of 62 mm, which reactors are connected by heat exchangers (5a, 5b, 5c) and are provided with inlets for monomer and solvent (1, 2a, 2b, 2c, 2d) and in each case with a premixing stretch (3a, 3b, 3c, 3d).

EXAMPLE 1

Preparation of a styrene homopolymer having a narrow molecular weight distribution

| | 1st reactor (4a) |
|---|---|
| Feed mixture | 108 kg/hour of cyclohexane |
| | 355 ml/hour of a 12% strength solution of sec-butyllithium in cyclohexane |
| | 18 kg/hour of styrene |
| Inlet temperature | 38° C. |
| Outlet temperature | 90° C. |
| | 2nd reactor (4b) |
| Feed | 22 kg/hour of styrene |
| Inlet temperature | 37° C. |
| Outlet temperature | 89° C. |
| | 3rd reactor |
| Feed | 27 kg/hour of styrene |
| Inlet temperature | 42° C. |
| Outlet temperature | 92° C. |
| | 4th reactor (4c) |
| Feed | 33 kg/hour of styrene |
| Inlet temperature | 42° C. |
| Outlet temperature | 93° C. |

At the end of reactor 4d the polymer mass fraction $Y_p$ was 0.48. The space-time yield based on the capacity of the whole apparatus was 1000 kg of polymer per $m^3$ and per hour. The weight average degree of polymerization of the end product was $\overline{P}_w = 2050$. The polydispersity (nonuniformity) $\overline{P}_w/\overline{P}_n$ was 1.1.

EXAMPLE 2

Preparation of a styrene homopolymer whose molecular weight distribution exhibits three discrete maxima

| | 1st reactor |
|---|---|
| Feed mixture | 107 kg/hour of methylcyclohexane |
| | 85 ml/hour of a 12% strength solution of butyllithium |
| | 9 kg/hour of styrene |
| Inlet temperature | 65° C. |
| Outlet temperature | 90° C. |
| | 2nd reactor |
| Feed | 23 kg/hour of styrene |
| | 170 ml/hour of a 12% strength solution of butyllithium |
| Inlet temperature | 36° C. |
| Outlet temperature | 89° C. |
| | 3rd reactor |
| Feed | 27 kg/hour of styrene |
| Inlet temperature | 40° C. |
| Outlet temperature | 91° C. |
| | 4th reactor |
| Feed | 33 kg/hour of styrene |
| | 100 ml/hour of a 12% strength solution of butyllithium |

| | -continued |
|---|---|
| Inlet temperature | 55° C. |
| Outlet temperature | 95° C. |

The molecular weight distribution of the end product exhibits three maxima:
  1st peak $\overline{P} = 650.10\%$ of the product
  2nd peak $\overline{P} = 2100.5\%$ of the product
  3rd peak $\overline{P} = 3950.36\%$ of the product
The space-time yield was 920 kg/$m^3$/hour.

EXAMPLE 3

Preparation of an SBS block copolymer

| | 1st reactor |
|---|---|
| Feed mixture | 108 kg/hour of methylcyclohexane |
| | 350 ml/hour of a 12% strength solution of butyllithium |
| | 18 kg/hour of styrene |
| Inlet temperature | 38° C. |
| Outlet temperature | 92° C. |
| | 2nd reactor |
| Feed | 1 kg/hour of butadiene |
| Inlet temperature | 67° C. |
| Outlet temperature | 119° C. |
| | 3rd reactor |
| Feed | 13 kg/hour of butadiene |
| Inlet temperature | 66° C. |
| Outlet temperature | 121° C. |
| | 4th reactor |
| Feed | 19 kg/hour of styrene |
| Inlet temperature | 41° C. |
| Outlet temperature | 87° C. |

The space-time yield was 620 kg/$m^3$/hour.

EXAMPLE 4

Preparation of an SB copolymer having a narrow molecular weight distribution

| | 1st reactor |
|---|---|
| Feed mixture | 125 kg/hour of methylcyclohexane containing 1% of THF |
| | 270 ml/hour of a 12% strength solution of butyllithium |
| | 13 kg/hour of monomer mixture (styrene) and |
| Inlet temperature | 49° C. |
| Outlet temperature | 84° C. |
| | 2nd reactor |
| Feed | 16 kg/hour of monomer mixture |
| Inlet temperature | 43° C. |
| Outlet temperature | 80° C. |
| | 3rd reactor |
| Feed | 19 kg/hour of monomer mixture |
| Inlet temperature | 48° C. |
| Outlet temperature | 88° C. |
| | 4th reactor |
| Feed | 21 kg/hour of monomer mixture |
| Inlet temperature | 48° C. |
| Outlet temperature | 88° C. |

The polymer solution leaving the 4th reactor has a polymer mass fraction of $Y_p = 0.36$. The weight average degree of polymerization of the end product is $\overline{P}_w = 2100$.

The polydispersity of the molecular weight distribution $\overline{P}_w/\overline{P}_n$ is 1.2.

EXAMPLE 5

Preparation of a styrene homopolymer having a broad molecular weight distribution

| | 1st reactor |
|---|---|
| Feed mixture | 108 kg/hour of cyclohexane |
| | 340 ml/hour of a 12% strength solution of butyllithium |
| | 22 kg/hour of styrene |
| Inlet temperature | 40° C. |
| Outlet temperature | 99° C. |
| | 2nd reactor |
| Feed | 26 kg/hour of styrene |
| | 40 ml/hour of a 12% strength solution of butyllithium |
| Inlet temperature | 42° C. |
| Outlet temperature | 100° C. |
| | 3rd reactor |
| Feed | 31 kg/hour of styrene |
| Inlet temperature | 40° C. |
| Outlet temperature | 100° C. |
| | 4th reactor |
| Feed | 38 kg/hour of styrene |
| Inlet temperature | 47° C. |
| Outlet temperature | 106° C. |

The end product has a weight average degree of polymerization of $\bar{P}_w$ of 2450 and a polydispersity of the molecular weight distribution $\bar{P}_w/\bar{P}_n$ is 1.2.

We claim:

1. A process for preparing styrene polymers by continuous anionic polymerization, wherein styrene monomers are polymerized in the presence of an organometallic initiator wherein the monomer or monomers and the organometallic initiator are added in solution to a tubular reactor arrangement operating essentially without backmixing and are left in the reactor arrangement until the monomer has been consumed, wherein the polymerization is carried out in a first reactor and at least one additional successive tubular reactor operating in each case essentially adiabatically, with in each case at least one heat exchanger arranged between the reactors.

2. A process as claimed in claim 1, wherein a proportion of the starter is added to at least one reactor connected downstream of the first reactor.

3. A process as claimed in claim 1, wherein further monomer is fed in upstream of at least one further tubular reactor.

* * * * *

UNITED STATES PATENT AND TRADEMARK OFFICE
CERTIFICATE OF CORRECTION

PATENT NO.: 5,391,655

DATED: February 21, 1995

INVENTOR(S): BRANDSTETTER et al.

It is certified that error appears in the above-identified patent and that said Letters Patent is hereby corrected as shown below:

On the title page, item [22], the correct U.S. filing date is --October 18, 1993--.

Signed and Sealed this

Second Day of May, 1995

Attest:

BRUCE LEHMAN

Attesting Officer        Commissioner of Patents and Trademarks